May 21, 1957

E. C. RHYNE, JR 2,793,342

PRECISION FREQUENCY REGULATOR

Filed Dec. 22, 1955

United States Patent Office 2,793,342
Patented May 21, 1957

2,793,342

PRECISION FREQUENCY REGULATOR

Earl C. Rhyne, Jr., East Pepperell, Mass., assignor to Cline Electric Manufacturing Company, Chicago, Ill., a corporation of Delaware Application December 22, 1955, Serial No. 554,863

14 Claims. (Cl. 322—24)

My invention relates to motor-alternator systems for furnishing an alternating output current of regulated, stable frequency from an alternating-current supply line of fluctuating frequency and voltage.

It is known to regulate the frequency of an alternator by regulating the speed of its drive motor with the aid of resonant circuits that are energized from the alternator and provide a speed-regulating error voltage when the alternator frequency departs from the desired value. The known systems of this kind leave much to be desired. Some of them require the use of a direct-current motor so that a double conversion, namely from alternating supply current to direct current and from direct current to frequency-regulated alternating current, is necessary. Some of the known systems are greatly sensitive to voltage and frequency fluctuations of the supply line. An attempt to simply operate a speed-regulated induction motor from the supply line and have it drive the alternator, leads to undesired complications, or insufficient precision if the known induction-motor speed regulator systems are employed, because they are not sufficiently accurate or have slow transient response.

It is an object of my invention to convert alternating line current of fluctuating frequency and voltage into alternating current of precisely regulated frequency with the aid of an alternating-current induction motor which is directly energized from the supply line and is accurately speed regulated to secure the desired constancy of the alternator output frequency. It is also an object of the invention to effect the precision regulation by means of rugged and static circuit components thus eliminating all requirements for electronic discharge tubes or for regulating members, such as dynamos, rheostats or contacts, that must be mechanically actuated for effecting the regulation.

To achieve these objects, and in accordance with my invention, I drive the alternator by a wound-rotor motor whose stator circuit is energized by voltage taken directly from the alternating-current supply line; I further connect a continuously variable impedance device in the rotor circuit of the motor, and I regulate the motor speed in accordance with the desired degree of constancy of the alternator frequency by varying the effective impedance of the rotor circuit in dependence upon a condition-responsive voltage taken from the alternator output circuit so as to vary in dependence upon departure of the alternator voltage from the correct frequency.

According to another feature of my invention, I control the speed-regulating impedance in the rotor circuit by two condition-responsive voltages one of which is a frequency-response resonance voltage from the alternator while the other is derived from the rotor circuit of the motor and dependent upon slip conditions of the motor. Either one of these two voltages is applied for normally providing all or most of the control power needed for regulating the motor speed by rotor-circuit impedance variation, whereas the second condition-responsive voltage serves to provide a corrective or auxiliary effect.

In one of its aspects, particularly described below, the voltage derived from the rotor circuit is taken directly from across the secondary or slip-ring terminals of the motor and is used for predominantly controlling the impedance variation in the rotor circuit so as to regulate the motor for constant slip with the result that the system has inherently the tendency of running the induction motor at a stable speed approximately equal to the one needed for the desired alternator frequency. In this system, the second pilot voltage, taken from the alternator through resonant circuit components tuned to make this voltage a minimum or zero at the precise alternator frequency, modifies the basic control effect of the slip-ring voltage. As a result, the resultant saturation control tends to maintain the motor speed precisely at the value corresponding to the minimum or zero point of the tuned-circuit pilot voltage, and any departure of the motor speed from the accurate value causes the rotor-circuit impedance to change more abruptly and to a larger extent than obtainable with the slip-ring voltage alone. The regulating system, as a whole, thus secures the desired precision of the alternator frequency by virtue of a sensitized performance of great inherent stability.

In another aspect of the invention, I control the variable impedance device in the rotor circuit primarily by a polarity-reversible voltage taken from the alternator through tuned resonance components, and I superimpost upon the impedance variation a damping effect under control by a voltage taken from the rotor circuit and responsive to departure of the rotor voltage from the steady-state condition.

Generally, in systems according to the invention the impedance device in the rotor circuit may be of any suitable type affording a continuous, or substantially continuous, variation of an ohmic or reactive resistance. For instance, ohmic resistors such as magnetically controllable rheostats or carbon piles, also controllable space-discharge tubes or semiconductor devices may be used. According to another feature of the invention, however, I prefer providing the rotor circuit with saturable reactor devices or magnetic amplifier devices whose main reactance windings are serially connected in the rotor circuit and vary their effective reactance under control by saturation control coils traversed by direct current.

Thus, in one embodiment of the invention, the impedance device is the rotor circuit of the drive motor consists of saturable reactors, preferably one in each phase so as to form a balanced arrangement. According to another feature of the invention, the impedance device in the rotor circuit is formed by a multi-phase magnetic amplifier of the self-saturating type. Preferably, a pair of mutually parallel reactors are connected in each phase of the rotor circuit in series with respective half-wave rectifiers of mutually opposed poling. Such an amplifier in the rotor circuit greatly increases the gain of the system without appreciable increase in the number and space requirements of the system components.

These and more specific objects, advantages and features will be apparent from, and will be set forth in, the following description of the embodiments of the invention illustrated on the drawings in which.

Figure 1:
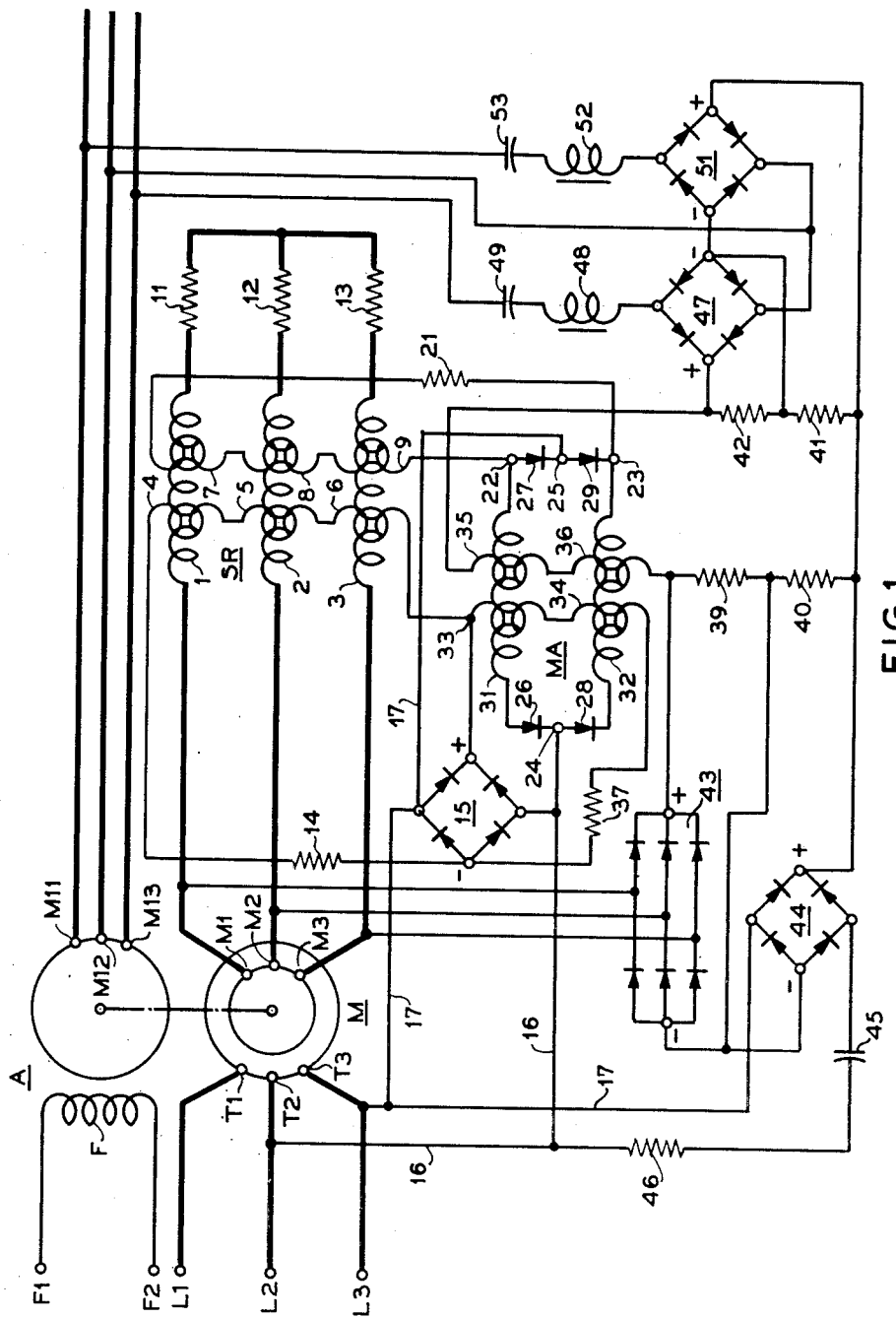
Fig. 1 is a schematic circuit diagram of a frequency-regulated motor-alternator system.

In the system of Fig. 1, an alternator A is driven from a wound-rotor motor M to provide at terminals M11, M12, M13 an alternating current of precisely regulated frequency, for instance of 400 C. P. S., although the frequency of the supply line energizing the motor M may vary appreciably from its rated value, for instance of 60 C. P. S. The primary or stator terminals T1, T2, T3 of the motor M are connected to the respective terminals or buses L1, L2, L3 of the alternating-current supply line. The voltage of alternator A depends upon the direct current supplied to its field winding F through terminals F1 and F2 from a source of constant voltage and can be set to any desired value by means of a voltage regulator of any suitable or conventional kind which is not illustrated because not essential to the invention proper.

Since the alternator frequency is to be precisely regulated under all normal conditions of alternator load, supply-line voltage, and supply-line frequency, the speed of motor M must be held constant within extremely narrow limits throughout all such normal variations. This is done with the aid of the components described presently.

A variable impedance device SR has the alternating-current windings 1, 2, 3, of three saturable reactors connected to the secondary terminals M1, M2, M3 of the motor M in series with resistors 11, 12, 13. The reactors are shown schematically only. Actually, and in accordance with the usual practice, the reactor in each phase comprises two alternating-current windings disposed on separate saturable cores or on the two outer legs of a three-legged core; and the cores are saturation controlled by pre-magnetizing coils. These coils of the three reactors comprise respective saturation bias coils 4, 5, 6 and respective saturation control coils 7, 8, 9. The bias coils 4, 5 and 6 are connected in series with a current limiting resistor 14 across the output terminals of a full-wave rectifier 15 which is energized by leads 16, 17 from line terminals L2 and L3 and supplies the bias coils 4, 5, 6 with constant adjusted current in order to impose a constant pre-magnetization upon the iron cores of the reactors in device SR. The change in saturation and impedance of the reactor windings 1, 2, 3 is controlled by coils 7, 8, 9. These coils are connected in series with a resistor 21 across the output terminals 22 and 23 of an amplifier MA. The amplifier, which in the illustrated embodiment is designed as a magnetic amplifier, is supplied at terminals 24 and 25 with power from the alternating-current supply line through leads 16 and 17. Connected between the power supply terminals 24 and 25 is a loop circuit formed by four rectifier units 26, 27, 28, 29 and two saturable reactor windings 31 and 32. The connection and poling of the loop components is such that rectified current is supplied from output terminals 22, 23 to control coils 7, 8, 9.

The two saturable reactors of amplifier MA are each equipped with a pre-magnetizing bias coil 33 or 34, and with a saturation control coil 35 or 36. The bias coils 33 and 34 are connected in series with a resistor 37 across the output terminals of the above-mentioned constant-voltage rectifier 15. The degree of saturation and hence the effective impedance of windings 31 and 32 is controlled by the coils 35 and 36. These coils are connected in a mixer circuit which comprises four resistors 39, 40, 41, 42 in series with each other. Each of these four resistors is connected across a different source of voltage. Consequently the voltage drops across these four resistors impress four component voltages upon the mixer circuit so that the resultant voltage, effective across control coils 35 and 36, is the algebraic sum of the four component voltages as will be explained presently.

Resistor 39 is connected across the output terminals of a rectifier 43 energized from across motor secondary terminals M1, M2, M3. Consequently the component voltage impressed upon the mixer circuit by resistor 39 is proportional to the secondary voltage of motor M. The rectifier 43 is preferably a three-phase full-wave rectifier as illustrated, in order to minimize tendencies of hunting at low rotor frequencies. The component voltage of resistor 39 is proportional to the slip of the motor and thus is indicative of the actual motor speed. This is so because the regulating impedance device SR, seen from the line terminals, is connected beyond the slip-rings so that it controls the motor speed by varying the power dissipation in the rotor circuit rather than by changing the primary terminal voltage and the power supplied to the motor. Under such regulating conditions, the primary terminal voltage and the rotating magnetic field of the motor M have a substantially constant magnitude, and the voltage appearing across the rotor terminals M1, M2, M3 is directly proportional to the slip of the motor. It will be recognized therefore that the speed of motor M can be held approximately constant by holding the rotor voltage across terminals M1, M2, M3 constant. This is accomplished by comparing in the mixer circuit the speed signal voltage of resistor 39 with a constant voltage of adjusted magnitude appearing across the resistor 40.

Resistor 40 is connected across the output terminals of a rectifier 44 which receives alternating current from line terminals L2 and L3 through leads 16 and 17 in series with a capacitor 45 and a resistor 46. The resistance of resistor 46 is so chosen or adjusted that the constant voltage impressed across resistor 40 is the one at which the motor M will run at approximately the correct speed required for obtaining the desired alternator frequency. The capacitor 45 has a compensating effect upon the speed-reference voltage across resistor 40 so that the motor speed regulated by means of the impedance device SR is not affected by variations in frequency of the line current supplied at terminals L1, L2, L3. However, rectifier 44 may also consist of a three-phase full-wave rectifier.

Resistor 42 is connected across the output terminals of a rectifier 47 which is energized from across the alternator terminals M12 and M13 through a series-resonant circuit comprising an inductance 48 and a capacitance 49. Resistor 41 is energized by direct current from a rectifier 51 which is connected across the alternator terminals M11 and M12 through another series-resonant circuit which comprises an inductance 52 and a capacitance 53. The operation of these two tuned circuits will be described in a later place.

For explaining the frequency regulating performance of the system, the presence and functioning of the resistors 41 and 42 in the mixer circuit may first be neglected. Then, the error voltage, which the mixer circuit impresses upon the amplifier control coils 35 and 36, is determined only by the difference between the fixed reference voltage across resistor 40 and the variable speed-intelligence voltage across the resistor 39. Assume that the motor speed is increasing beyond the value that corresponds to the desired frequency of the alternator. Then the slip-ring voltage across the secondary motor terminals decreases. This causes a corresponding decrease in signal voltage across resistor 39. The fixed reference voltage across resistor 40 therefore now drives a current through the mixer circuit in the direction required to reduce the degree of saturation of the iron cores in the amplifier MA, thus increasing the effective impedance of amplifier windings 31 and 32 so that less current will pass through control coils 7, 8, 9. This reduces the saturation of the reactor main windings 1, 2, 3 so that the impedance of the reactor windings is increased and causes the current in the rotor circuit to become too small for the motor to develop enough torque to support the load. Hence the motor slows down.

On the other hand if the motor runs slower than the speed required for the alternator to deliver output current of the correct frequency, the speed signal voltage across resistor 39 becomes larger than the reference voltage across resistor 40 so that a current will pass through the mixer circuit in the opposite direction with the ultimate result of reducing the effective impedance of the reactor windings 1, 2, 3 in device SR. Under these conditions the motor M receives more current and accelerates.

As a result of such regulating performance, the speed at which the motor will actually run continuously, still neglecting the effect of the voltages across resistors 41 and 42, is such that the signal voltage across resistor 39 is kept slightly greater than the fixed reference voltage across resistor 40, the difference being equal to the voltage drop across the amplifier control coils 35 and 36. As mentioned, the fixed reference voltage across resistor 40 should be adjusted by means of the resistor 46 so that the rotor voltage is regulated for a value which results in approximately the correct rotor speed needed for securing the desired alternator frequency.

However, the operation of the system as far as described is only capable of approximately maintaining the desired alternator frequency but would not be adequate for a precise speed regulation of the motor M under all conditions of alternator load and for all expectable fluctuations in line frequency and line voltage. It is the purpose of the resistors 41, 42 and of the associated tuned energizing circuits to provide for the required precision in regulating performance.

Figure 3:
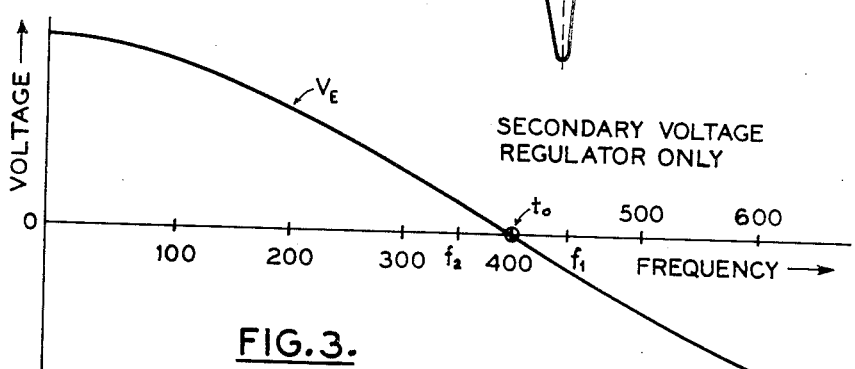
Figure 4:
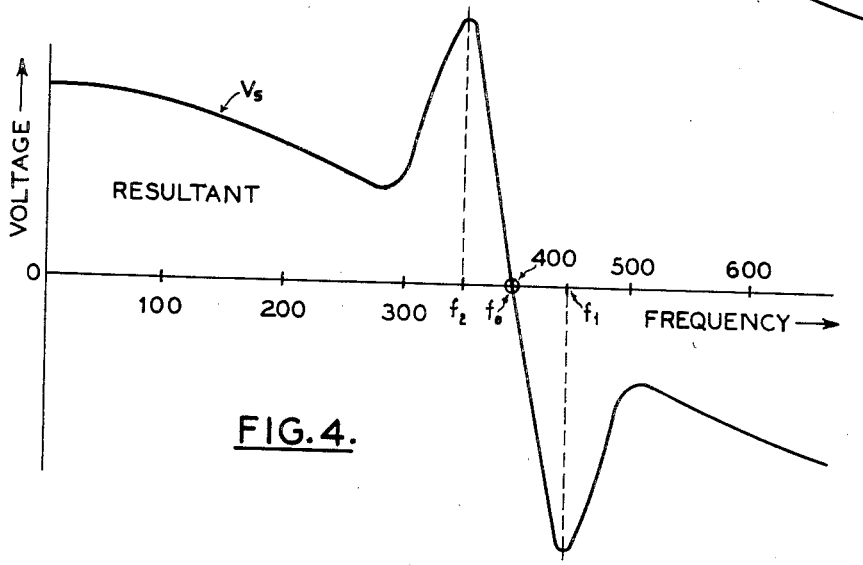

The circuit of capacitor 49 and inductor 48 is tuned to resonate sharply at a frequency slightly above the desired frequency of the alternator. The capacitor 53 and inductor 52 are tuned to resonate sharply at a frequency slightly lower than the desired frequency. Since the two voltages across resistors 41 and 42 are poled in series opposition, they jointly produce a steep voltage wave which has a zero passage at the desired alternator frequency and has relatively high and steep peaks closely adjacent to the desired frequency value at either side thereof. This will be more fully understood from the schematic diagrams illustrated in Figs. 2, 3 and 4.

Figure 2:
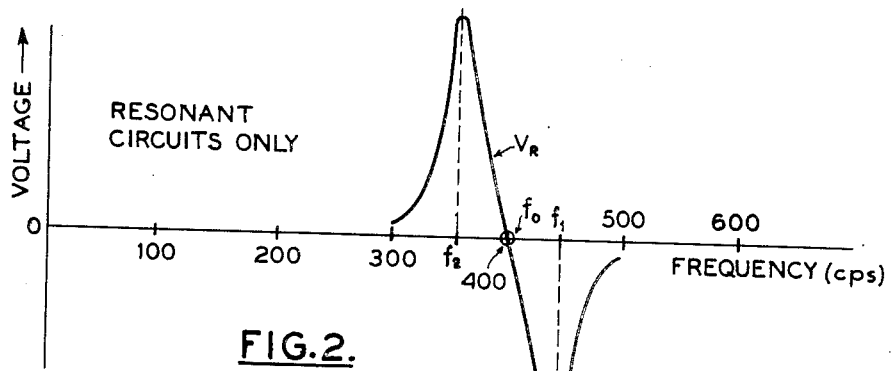
Figs. 2, 3 and 4 are explanatory diagrams relating to the same system.

The desired alternator frequency is denoted by $f_0$ and is assumed to be 400 C. P. S. Capacitor 49 and inductor 48 are tuned to resonate sharply at a frequency $f_1$ slightly above the desired frequency $f_0$. Capacitor 53 and inductor 52 are tuned to resonate at a frequency $f_2$ slightly below the value $f_0$. The voltage across resistor 42 therefore is very large and the voltage across resistor 41 is very small at the frequency $f_1$. Conversely, the voltage across resistor 41 is very large and the voltage across resistor 42 is very small at the frequency $f_2$. At the desired frequency $f_0$ both voltages are small and substantially equal. Consequently the resultant voltage has a shape as schematically represented in Fig. 2 by curve $V_R$.

This combined resonance voltage of resistors 41 and 42 is superimposed upon the error voltage $V_E$ resulting from the mutually differential relation of the voltages across resistors 39 and 40. The error voltage $V_E$ also passes through zero at or near the desired frequency value $f_0$, but its increase towards positive or negative values, due to departure of the motor speed from the correct value, has a much smaller rate of change, resulting in a curve shape as exemplified by curve $V_E$ in Fig. 3. The superposition of voltage $V_R$ (Fig. 2) upon the error voltage $V_E$ (Fig. 3) produces in the mixer circuit a resultant voltage as represented by curve $V_S$ in Fig. 4. The effect of the superposition is to enforce a zero passage at the frequency point $f_0$ and to abruptly and very greatly change the resultant voltage if the motor speed departs only slightly from the correct value. It will be seen that the polarity of the voltage across resistor 42 must be such as to add to the reference voltage of resistor 40 thus tending to slow down the motor speed. When the alternator frequency is greater than the desired value $f_0$, the voltage across resistor 42 is much greater than the voltage across resistor 41. Consequently the motor decelerates. When the alternator frequency is lower than the desired frequency $f_0$, the voltage across resistor 41 is much greater than the voltage across resistor 42 and the motor speeds up.

In summary the effect of resistors 41 and 42 is to impart to the resultant control voltage a very large rate of change and a large magnitude in the immediate vicinity of the frequency value $f_0$. Consequently the regulating performance is highly sensitive and causes a much more pronounced change in impedance of the value of impedance device SR with the effect of regulating the generator frequency with the desired degree of precision.

Figure 5:
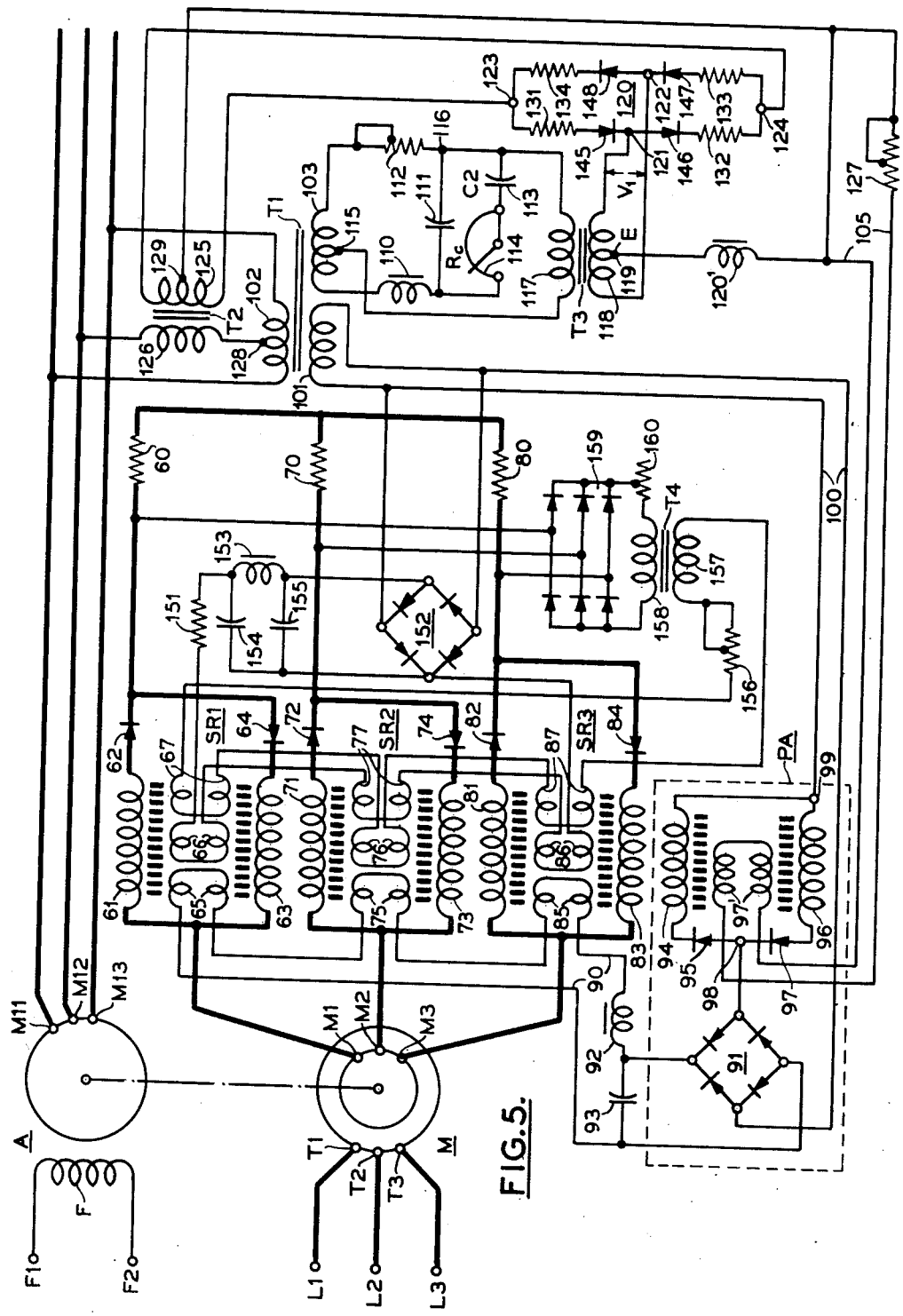
Fig. 5 is a schematic circuit diagram of a modified system.

The system illustrated in Fig. 5, like the one described with reference to Fig. 1, serves to convert alternating current of fluctuating frequency and voltage into alternating current of precisely staple frequency. For instance, when the frequency of the available line current is 60 C. P. S. and fluctuates within plus and minus 5%, then the system may serve to provide an alternating output current of 60 C. P. S. with a frequency variation within plus and minus 0.5%.

The alternator A for providing the regulated frequency has its field winding F energized at terminals F1, F2 by constant direct voltage of a magnitude corresponding to that of the alternating voltage to be generated. The generator is driven by a wound-rotor motor M which has its stator terminals T1, T2, T3 energized from the line terminals or buses L1, L2, L3. The rotor circuit, connected to the secondary or slip-ring terminals M1, M2, M3 comprises in each of its three phases a resistor 69, 70 or 80 in series with one of the units SR1, SR2 or SR3 of a three-phase magnetic amplifier of the self-saturating type. The magnetic amplifier unit SR1 has two parallel branches. One branch is composed of a main reactor winding 61 and a half-wave rectifier 62. The other branch comprises a main winding 63 and a half-wave rectifier 64. The rectifiers 62 and 64 are poled in opposition to each other so that one half wave of current flows through winding 61 and the other half wave flows through winding 63. Each of the two saturable iron cores of the respective reactors is equipped with three premagnetizing coils 65, 66, 67. Coils 65 are the main saturation control coils of the amplifier unit SR1. Coils 66 in amplifier unit SR1 are supplied with constant direct current to provide a constant premagnetizing bias. Coils 67 in amplifier unit SR1 serve to impose a damping effect.

Amplifier units SR2 and SR3 are similar to unit SR1. The components denoted by 71 through 77 in unit SR2, and the components denoted by 81 through 87 in amplifier unit SR3 correspond to the above-described components 61 through 67 respectively of unit SR1.

The main control coils 65, 75 and 85 of the three-phase amplifier assembly are all connected in a control circuit 90 which receives variable direct voltage from the output terminals of a full-wave rectifier 91 through a filter choke 92 and in parallel relation to a filter capacitor 93. The provision of a filter, as exemplified by components 92 and 93, is desirable for eliminating upper harmonics, mainly second harmonics, from the control circuit.

The rectifier 91 forms part of a preamplifier PA likewise of the magnetic self-saturating type. The preamplifier has two parallel circuit branches. One branch includes a saturable reactor winding 94 in series with a half-wave rectifier 95. The second branch is formed by another saturable reactor winding 96 in series with a half-wave rectifier 97. The reactor circuit is energized through rectifier 91 at power input terminals 98 and 99 from an alternating-current circuit 100 of constant voltage. Consequently, the voltage drop impressed across the input terminals of rectifier 91, and hence the rectified output voltage impressed upon the control circuit 90 depends upon the current supplied to the two saturation control windings 97' of the reactor windings 94 and 96 respectively. The power supply circuit 100 is energized from the secondary winding 101 of a transformer T1 whose primary 102 is connected across the terminals or buses M11 and M13 of the alternator A.

Transformer T1 has another secondary winding 103 which supplies voltage to a resonant bridge circuit composed of an inductance coil 110, a capacitor 111 and a bridge-balancing resistor 112. Connected parallel to capacitor 111 is a capacitor 113, of smaller capacitance, in series with a calibrating resistor 114. With the aid of resistor 114 the resonant circuit is accurately tuned to the desired frequency of the alternator output.

A coupling transformer T3 has a primary winding 117 connected to a mid-tap 115 of secondary winding 103 and to a point 116 between capacitor 111 and resistor 112. It will be recognized that the primary 117 of transformer T3 forms part of the diagonal branch of a bridge network. When the alternator frequency is exactly equal to the tuned frequency of the resonant circuit, the resistance of resistor 112 is equal to the effective resistance of inductor 110 and capacitor 111 so that the bridge network is balanced and no voltage is applied to the primary 117 of transformer T3. However, when the alternator frequency is above the correct value, the reactive impedance of inductor 110 predominates and unbalances the bridge network so that a reactive voltage is impressed across the primary 117. Similarly, when the frequency of the alternator is below the correct value, a capacitive voltage is impressed across primary 117. By comparison, the reactive voltage due to over-frequency is lagging, whereas the capacitive voltage due to under-frequency has a leading phase angle relative to a phase reference mentioned below.

The secondary 118 of transformer T3 is connected across a pair of diagonal points 121 and 122 of a ring-type demodulator network 120 which is essentially an alternating-current bridge network and has its other pair of terminals 123, 124 connected across the secondary winding 125 of a transformer T2. The primary 126 of transformer T2 is connected between alternator terminal M12 and a mid-tap 128 of primary 102 in transformer T1. The voltage of secondary 125 (T2), by virtue of the circuit connection described, is 90° out of phase with respect to the voltage of secondary 103 in transformer T1. These two voltages may be given approximately the same amplitude. For instance, the voltage of secondary 125 may be 110 volts, whereas the voltage of secondary 103 is preferably somewhat higher and may be 120 volts. The demodulator bridge network 120 is composed of four ohmic resistors 131, 132, 133, 134 of equal resistance and four half-wave rectifiers 145, 146, 147 and 148. The sequence of connection and the relative polarities of the rectifiers are as illustrated on the drawing.

The control circuit 105 of pre-amplifier PA extends from the mid-tap 119 of secondary 118 in transformer T3, through a filter choke 120', thence through the control coils 97 of pre-amplifier PA and a calibrating resistor 127 to a mid-tap 129 of secondary 125 in transformer T2.

When the alternator frequency is exactly in accordance with the frequency to which the resonant bridge network is tuned, so that the voltage across points 121 and 122 of the demodulator network 120 is zero, the reference voltage from secondary 125 of transformer T2 does not cause any flow of direct current through the control circuit 105. Consequently, the control coil 97' of pre-amplifier PA is substantially unexcited. A demodulator network of the type illustrated usually passes upper harmonics, mainly second harmonic ripples, but these are filtered out by means of the choke 120'.

When the alternator frequency is higher than the correct value, the transformer secondary 118 (T3), as explained above, impresses across points 121 and 122 of demodulator network 120 a voltage which which, instead of being 90° out of phase relative to the reference voltage from transformer T2, has a lagging phase angle. As a result, the current passes between tap points 119 (T3) and 129 (T2) through the circuit 105 of amplifier control coils 97' with the effect of reducing the saturation of the amplifier substantially down to cut-off. Now, only a slight amount of current can flow through the control circuit 90 of main amplifier units SR1, SR2, SR3.

When the alternator frequency is below the correct value, the voltage now induced in secondary 118 (T3) has a leading phase angle relative to the normal phase difference of 90°. This causes a current to flow between tap points 119 and 129 through control circuit 105 in the opposite direction with the result of increasing the saturation of the pre-amplifier PA. Consequently, the amplifier windings 94, 96 reduce their reactance, and more current passes from rectifier 91 through the control circuit 90 of the magnetic amplifier units SR1, SR2, SR3. In summary, the resonance-controlled demodulator network 120 operates essentially to transform reversible-phase alternating-current into reversible-polarity direct-current signals; and it will be understood that other demodulating devices of the same over-all performance may be used instead.

By virtue of the above-described operation of the control coils 65, 75, 85, the effective impedance of the amplifier units SR1, SR2, SR3 in the rotor circuit of motor M is increased whenever the frequency of the alternator tends to rise above the correct value; and conversely, the effective impedance in the rotor circuit is decreased whenever the alternator frequency shows the tendency to drop below the correct value. As a result, the system operates to accurately maintain the alternator frequency within the desired narrow limits.

As mentioned above, the coils 66, 76 and 86 of the magnetic amplifiers in the rotor circuit serve to provide these amplifiers with adjusted constant premagnetizing bias. For this purpose, coils 66, 76, 86 are connected through a calibrating resistor 151 across the output terminals of a full-wave rectifier 152 energized from the constant-voltage secondary 101 of transformer T1. The energizing circuit is preferably equipped with a filter for eliminating the effect of harmonics. This filter is shown composed of a choke coil 153 and two capacitors 154, 155 in pi connection.

The coils 67, 77 and 87 of the three magnetic amplifier units in the rotor circuit are connected in series with a calibrating resistor 156 to the secondary winding 157 of a transformer T4 which has its primary winding 158 energized through a three-phase rectifier bridge 159 from across the rotor-circuit resistors. A calibrating resistor 160 is preferably connected between primary 158 and rectifier 159. The voltage applied to rectifier 159 is proportional to the rotor current. The transformer T4 operates as a damping transformer. That is, it induces in secondary 157 a voltage corresponding to the rate of change in rotor current. Under steady-state operating conditions, therefore, no voltage is impressed upon the coils 67, 77 and 87. But in the event of a change in rotor current brought about by an incipient departure of the motor speed from the correct value, an immediate effect is produced by these coils, tending to oppose the change in current, thus stabilizing the regulating system. As a result, a system of the type shown in Fig. 5 also affords the advantages and improvements explained above with reference to the system illustrated in Fig. 1.

It will be apparent to those skilled in the art, upon a study of this disclosure, that my invention permits of a variety of modifications and may be embodied in control systems and with the aid of circuit components other than those specifically illustrated and described, without departing from the essence of the invention and within the scope of the claims annexed hereto.

I claim:
1. A motor-alternator system of regulated output frequency, comprising an alternator, a wound-rotor motor in driving connection with said alternator and having a rotor circuit, continuously variable impedance means connected in said rotor circuit and having impedance control means, said impedance control means comprising a condition-responsive source of control voltage connected with said alternator for response to changes in alternator frequency.

2. A motor-alternator system of regulated output frequency, comprising an alternator, a wound-rotor motor in driving connection with said alternator and having a rotor circuit, a saturable reactor device serially connected in said rotor circuit and having saturation control coils for varying the effective reactance of said device, a magnetic amplifier having a direct-current output circuit connected with said control coils for supplying them with variable control voltage, and circuit means connecting said amplifier with said alternator for controlling said amplifier in dependence upon the alternator frequency.

3. A motor-alternator system of regulated output frequency, comprising an alternator, a wound-rotor motor in driving connection with said alternator and having a rotor circuit, continuously variable impedance means connected in said rotor circuit and having impedance control means, said impedance control means comprising a condition-responsive source of control voltage having a resonant circuit connected with said alternator and tuned for response to departure of the alternator voltage from the correct frequency.

4. A motor-alternator system of regulated output frequency, comprising an alternator, a wound-rotor motor in driving connection with said alternator and having a rotor circuit, a saturable reactor device serially connected in said rotor circuit and having saturation control coils for varying the effective reactance of said device, control means connected with said coils and having a source of variable control voltage, said source comprising a resonant circuit connected with said alternator and tuned for response to departure of the alternator voltage from the correct frequency.

5. A motor-alternator system of regulated output frequency, comprising an alternator, a wound-rotor motor in driving connection with said alternator and having a rotor circuit, a self-saturable magnetic amplifier serially connected in said rotor circuit and having two parallel branches each composed of a saturable reactor and a half-wave rectifier poled in opposition to the half-wave rectifier of the other branch, each of said reactors having a saturation control coil, and control means connected with said coils and having a source of variable control voltage connected with said alternator and responsive to changes in alternator frequency.

6. A motor-alternator system of regulated output frequency, comprising an alternator, a wound-rotor motor in driving connection with said alternator and having a rotor circuit, a self-saturable magnetic amplifier serially connected in said rotor circuit and having two parallel branches each composed of a saturable reactor and a half-wave rectifier poled in opposition to the half-wave rectifier of the other branch, each of said reactors having a saturation control coil, and control means connected with said coils and having a source of variable control voltage, said source comprising a resonant circuit connected with said alternator and tuned for response to departure of the alternator voltage from the correct frequency.

7. A motor-alternator system of regulated output frequency, comprising an alternator, a wound-rotor motor in driving connection with said alternator, said motor having a rotor circuit, continuously variable impedance means connected in said rotor circuit and having impedance control means, said impedance control means having two component condition-responsive sources of control intelligence, one of said sources being connected to said rotor circuit for response to the rotor voltage, and said other source having resonant circuit means connected with said alternator and tuned for response to departure of the alternator voltage from the desired frequency.

8. A motor-alternator system of regulated output frequency, comprising an alternator, a wound-rotor motor in driving connection with said alternator, said motor having a rotor circuit, continuously variable impedance means connected in said rotor circuit and having impedance control means, said impedance control means having a source of constant reference voltage and two sources of variable voltage, one of said variable-voltage sources being connected to said rotor circuit for response to a given condition of the rotor voltage, the other variable-voltage source having resonant circuit means connected with said alternator and tuned for response to departure of the alternator voltage from the desired frequency.

9. In a system according to claim 8, said wound-rotor motor having a stator circuit, said constant-voltage source comprising a rectifier, and alternating-current circuit means connecting said rectifier with said stator circuit and having constant alternating output voltage.

10. A motor-alternator system of regulated output frequency, comprising an alternator, a wound-rotor motor in driving connection with said alternator, said motor having a rotor circuit, continuously variable impedance means connected in said rotor circuit and having impedance control means, said impedance control means having a source of constant reference voltage and two sources of variable voltage, said constant-voltage source being connected with said alternator to derive regulated voltage therefrom, one of said variable-voltage sources being connected to said rotor circuit for response to a given condition of the rotor voltage, the other variable-voltage source having resonant circuit means connected with said alternator and tuned for response to departure of the alternator voltage from the desired frequency.

11. A motor-alternator system of regulated output frequency, comprising an alternator, a wound-rotor motor in driving connection with said alternator, said motor having a rotor circuit, continuously variable impedance means connected in said rotor circuit and having impedance control means, said impedance control means comprising a control circuit having respective first, second and third resistor means connected in series with each other, a source of constant reference voltage connected across said first resistor means to impress a speed reference voltage upon said control circuit, means connecting said second resistor means with said rotor circuit to impress upon said control circuit a variable pilot voltage dependent upon motor speed, said first and second resistor means being poled in series opposed voltage relation to each other, and resonant circuit means connected between said third resistance means and said alternator for superimposing resonance voltage upon said pilot voltage, said resonant circuit means being tuned for response to departure of the alternator frequency from a desired value.

12. In a system according to claim 11, said third resistor means comprising two resistors in series with each other, and said resonant circuit means having two separate circuits connecting said respective two resistors with said alternator and tuned to respective frequencies near the desired alternator frequency but above and below respectively of said desired frequency.

13. A motor-alternator system of regulated output frequency, comprising an alternator, a wound-rotor motor in driving connection with said alternator and having a rotor circuit, a self-saturable magnetic amplifier serially connected in said rotor circuit and having two parallel branches each composed of a saturable reactor and a half-wave rectifier poled in opposition to the half-wave rectifier of the other branch, each of said reactors having saturation control means, a balanceable network connected with said alternator and having two impedance branches and a diagonal branch, one of said branches having an inductive and a capacitive component, said network being tuned to the desired alternator frequency to provide in said diagonal branch an alternating voltage of reversible phase depending upon the direction of departure of the alternator frequency from the desired value, a demodulator inputwise connected to said diagonal branch for converting said phase-reversible voltage into reversible-polarity direct voltage, and circuit means connecting said demodulator to said saturation control means, whereby the reactance of said magnetic amplifier in said rotor circuit is regulated in dependence upon said direct voltage to maintain the motor speed at a constant value corresponding to said desired alternator frequency.

14. A system according to claim 13, comprising a rectifier connected to said rotor circuit, a transformer connected between said rectifier and said control means to superimpose upon said control means a voltage dependent upon change in rotor voltage.

No references cited.